United States Patent Office 2,908,491
Patented Oct. 13, 1959

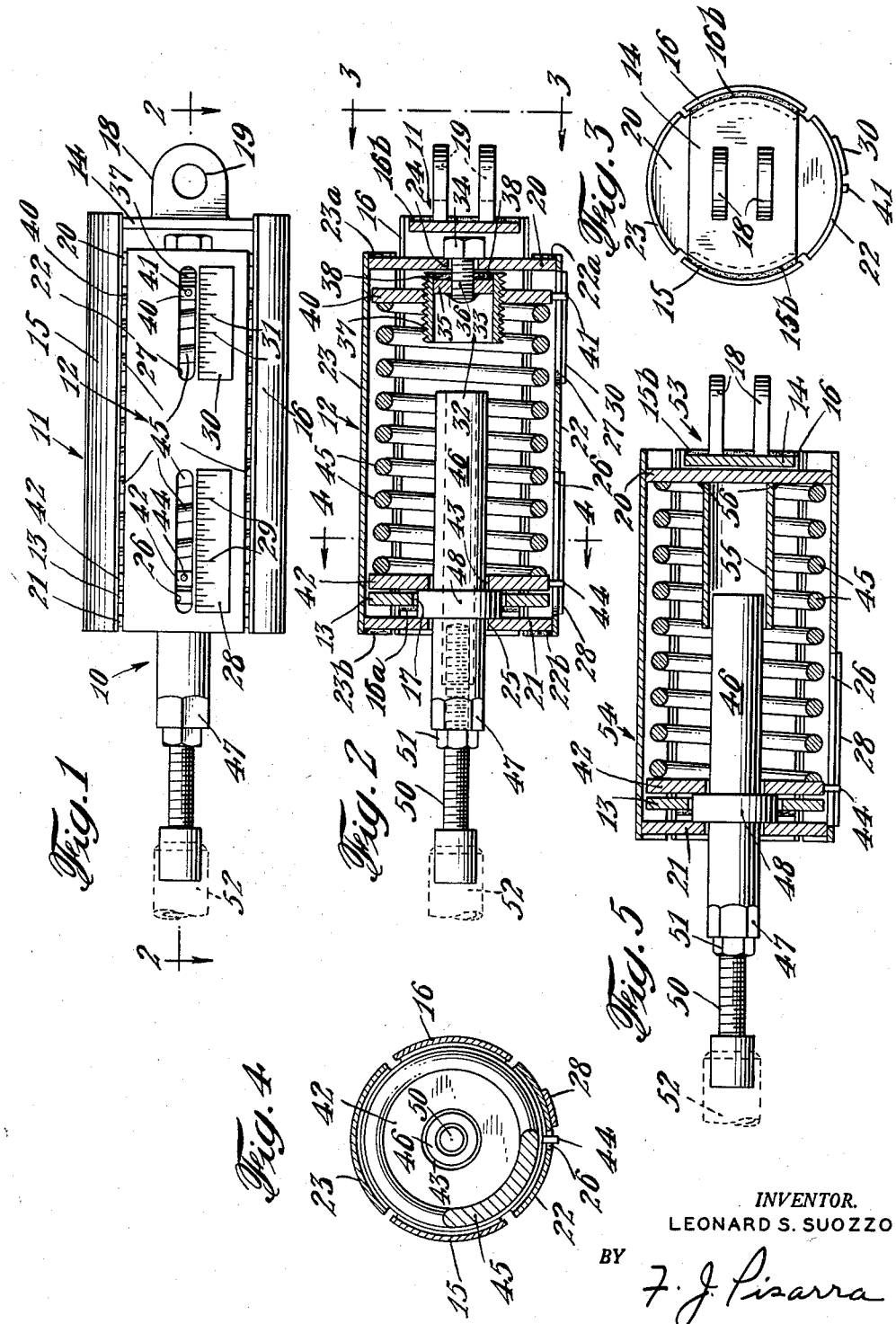

2,908,491

SWAY BRACE FOR PIPING

Leonard S. Suozzo, Hackensack, N.J., assignor to Bergen Pipesupport Corp., New York, N.Y., a corporation of New York Application May 3, 1955, Serial No. 505,689

9 Claims. (Cl. 267—1)

This invention relates to the art of sway braces and, in one of its more specific aspects, to an improved sway brace for absorbing vibrational forces created in piping and the like.

The sway brace of this invention may be used advantageously as an adjunct to various piping systems, including those employed in land power plants, on seagoing vessels, in refineries and in numerous industrial plants. It is common knowledge in the art that stresses due to vibrations and oscillations in piping systems may become sufficiently serious to damage the piping and/or equipment connected thereto. The sway brace of the present invention effectively and safely eliminates or compensates for vibrations and oscillations of the character indicated.

It is the primary object of the invention to provide a sway brace having improved features of design and construction.

Another object of the invention is to provide a sway brace that may be easily adjusted either during or after installation, the parts being so constructed and arranged that the loading of the sway brace may be readily increased up to its maximum capacity.

The invention has for another object the provision of a sway brace that may be readily varied in effective length as required by particular conditions of use.

A further object of the invention is to provide a sway brace that is simple, compact and sturdy in construction, that is reasonable in manufacturing, installation and maintenance costs, that is adapted to be readily installed and that is capable of operating in a dependable and efficient manner.

With the foregoing objects in view, a preferred form of sway brace embodying the invention includes a housing that is made up of a first unit which is adapted to be anchored to a support and a second unit which is slideable relative to the first unit. Each unit has spaced first and second end walls. The units are so arranged that the first end wall of each is positioned between the end walls of the other. Positioned within the housing and interposed between the first end walls of the units is a resilient first means which consists of a movable ring member and a helical compression spring. The resilient means normally and yieldingly urges the second unit in a direction to effect retraction thereof relative to the first unit. The sway brace is provided with a second means including a rod that is slideable through aligned openings in the first end wall of the first unit and in the second end wall of the second unit, as well as through the opening in the movable ring member. The rod carries a piston that bears at its opposite ends against the movable member and the second end wall of the second unit. The piston is adapted on movement of the rod in one direction to effect protraction of the second unit relative to the first unit against the action of the first means. The piston is adapted on movement of the rod in a reverse direction to coact with the movable member in effecting retraction of the second unit relative to the first unit, as will be evident from the ensuing description taken with the accompanying drawing.

The enumerated objects and other objects, together with the advantages of the invention, will be readily understood by persons skilled in the art from the following description and the annexed drawing, which respectively describe and illustrate sway brace constructions embodying the invention.

In the drawing:

Fig. 1 is a view in front elevation of a sway brace constructed in accordance with the invention;

Fig. 2 is a view in cross section taken along line 2—2 of Fig. 1;

Fig. 3 is an end view taken along line 3—3 of Fig. 2;

Fig. 4 is a view in cross section taken along line 4—4 of Fig. 2; and

Fig. 5 corresponds to Fig. 2 and is illustrative of a modified form of construction.

Referring now to the drawing wherein like reference numerals denote corresponding parts throughout the several views, and more particularly to Figs. 1 to 4, a complete sway brace embodying the invention is generally indicated by numeral 10. The sway brace includes a first unit 11 and a second unit 12 having their parts so constructed, configured and arranged as to constitute a generally cylindrical housing.

Unit 11 comprises a pair of spaced apart parallel end walls, namely a first end wall 13 and a second end wall 14, a top wall 15 and a bottom wall 16. Top wall 15 is secured to the end walls by welds, one such weld being indicated by numeral 15b (Fig. 3). Bottom wall 16 is similarly secured to the end walls by welds 16a and 16b. As will be noted from an examination of Figs. 3 and 4, walls 15 and 16 are spaced apart and are arcuate in transverse cross section. End wall 13 has a central through opening 17. End wall 14 is equipped with a pair of spaced arms 18 having aligned openings 19. Arms 18 are adapted to be connected to a suitable means such as a T-bracket (not shown) for anchoring unit 11 to a supporting structure (also not shown).

Unit 12 is similar to unit 11 and comprises a first end wall 20, a second end wall 21, a front wall 22 and a rear wall 23. Front wall 22 is secured to the corresponding end walls by welds 22a and 22b while rear wall 23 is secured to the corresponding end walls by welds 23a and 23b. As in the case of walls 15 and 16 of unit 11, walls 22 and 23 are spaced apart and arcuate in transverse cross section. Also walls 22 and 23 are positioned between walls 15 and 16. As will be observed from an examination of Figs. 3 and 4, the outer faces of walls 15, 16, 22 and 23 are elements of the surface of revolution of a right circular cylinder.

The first end wall of each unit is positioned between the end walls of the other unit. In other words, first end wall 13 of unit 11 is positioned between end walls 20 and 21 of unit 12; and first end wall 20 of unit 12 is positioned between end walls 13 and 14 of unit 11. It will be evident from the foregoing that units 11 and 12 are relatively slidable.

Walls 20 and 21 have aligned central openings 24 and 25, respectively. Wall 22 is additionally provided with a pair of elongated longitudinal slots 26 and 27. A first indicator plate 28 is affixed to wall 22 adjacent slot 26. This plate has graduations 29 that coact with parts, to be described, for indicating the loading on a spring that will be described further along. A second indicator plate 30 is affixed to wall 22 adjacent slot 27. This plate is provided with corresponding graduations 31 that coact with other parts, to be described, for indicating the loading on the spring.

The sway brace includes an adjustable means 32 that will now be described, reference being had to Fig. 2.

The adjustable means includes a bolt 33 having a head 34 and extending through opening 24 in end wall 20. The bolt engages a tapped ring 35 and is welded thereto as indicated at 36. Ring 35 is welded to an externally threaded tubular male member 37 as indicated at 38. Male member 37 threadedly engages a female member or ring 40 which serves as a spring plate. An indicator pin 41 is affixed to plate 40 and registers with slot 27. A wrench or similar tool (not shown) may be inserted between end plates 14 and 20 to engage bolt head 34 and effect rotation of the bolt and male member 37. It will be observed that rotation of the bolt in one direction will result in movement of plate 40 away from end plate 20, while rotation of the bolt in a reverse direction will result in movement of plate 40 toward plate 20.

Positioned within the housing is a movable ring member 42 having a central opening 43 and carrying an indicator pin 44 that registers with slot 26. Also within the housing is a helical compression spring 45 which bears at its opposite ends against ring 42 and plate 40. Ring 42 and spring 45 constitute a resilient means for normally and yieldingly urging second unit 12 into protracted position relative to unit 11.

A reciprocable hollow piston rod 46 extends through openings 25, 17 and 43 and projects into the interior of the housing. Rod 46 is internally threaded and is provided at its outer end with a head 47 that is adapted to be engaged and rotated by a suitable tool (not shown). A piston 48 is affixed to and reciprocable with rod 46. The piston is normally in registration with opening 17 and bears at its opposite ends against end wall 21 and movable member 42, as shown in Fig. 2. A rod 50 is threadedly connected to the piston rod and is adapted to be locked in selected position to the piston rod by a nut 51. Rod 50 carries a coupling means 52 for connection to the piping system.

For the purpose of outlining the operation of the form of the invention shown in Figs. 1 to 4, it is first assumed that the sway brace is assembled and that its parts are in the relative position shown in Fig. 2. It is further assumed that unit 11 is anchored by arms 18 and other devices (not shown) to a fixed support and that rod 50 is connected by coupling means 52 to the piping. Spring 45 is partially preloaded by adjusting means 32 thereby yieldingly maintaining unit 12 in the illustrated retracted position relative to unit 11.

It will be evident that rod 50, piston rod 46 and piston 48 are adapted to move in unison toward the right or toward the left, as viewed in Fig. 2, in response to corresponding movement of the piping. Movement of these rods toward the right causes the piston to act on movable ring member 42 and further compress spring 45, the forces creating such movement being absorbed by the spring. Movement of the rods and the piston toward the left, as viewed in Fig. 2, results in corresponding movement of unit 12 toward the left and further compression of the spring, and the forces creating such movement are absorbed by the spring.

The loading on the spring may be adjusted at the time of installation or at any time subsequent to installation by adjusting means 32 or by varying the combined effective length of rods 46 and 50. The combined effective length of these two rods may be readily increased or decreased by simply applying a suitable tool, such as a wrench (not shown), to head 47 and turning rod 46 relative to rod 50. Nut 51 serves the function of locking rod 46 to rod 50 after they have been properly adjusted. Thus, it will be observed that the compressive or tensile forces created in rods 46 and 50 may be quickly and easily equalized or varied from the selected initial force up to the maximum capacity of the sway brace.

Reference is next had to Fig. 5 for an understanding of the construction of the modification of the invention illustrated therein. The sway brace of the modification includes a first unit 53 and a second unit 54 that are relatively slidable. Unit 53 is similar to earlier described unit 11 and differs thereover primarily in that it does not include the adjusting means 32. Instead, unit 53 utilizes a tube 55 that is secured to end wall 20 by welds 56. Tube 55 is coaxial with piston rod 46 and serves as a guide therefor, as shown.

The operation of the modification shown in Fig. 5 is the same as that illustrated in Figs. 1 to 4.

From the foregoing, it is believed that the construction, operation and advantages of my present invention will be readily comprehended by persons skilled in the art. It is to be clearly understood, however, that various changes in the constructions described above and illustrated in the drawing may be made without departing from the scope of the invention, it being intended that all matter contained in the description or shown in the drawing shall be interpreted as illustrative only and not in a limiting sense.

I claim:

1. In a sway brace, a housing comprising a first unit adapted to be anchored to a support and a second unit slideable relative to the first unit, each unit including spaced first and second end walls, the first end wall of each unit being disposed between the end walls of the other unit, the first end wall of the first unit and the second end wall of the second unit having aligned through openings, resilient first means interposed between the first end walls of the units, said first means normally and yieldingly urging the second unit in a direction to effect retraction of the second unit relative to the first unit, and second means extending through said aligned openings and projecting into the housing and being adapted to be moved in opposite directions, said second means being adapted on movement thereof in one direction to engage the second unit and effect protraction thereof relative to the first unit against the action of the first means.

2. In a sway brace, a housing comprising a first unit adapted to be anchored to a support and a second unit slideable relative to the first unit, each unit including spaced first and second end walls, the first end wall of each unit being disposed between the end walls of the other unit, the first end wall of the first unit and the second end wall of the second unit having aligned through openings, resilient first means interposed between the first end walls of the units, said first means normally and yieldingly urging the second unit in a direction to effect retraction of the second unit relative to the first unit, and second means comprising a rod slideable through said openings and adapted to be moved in opposite directions, and a member carried by the rod and positioned between the second wall of the second unit and the first means, said member being adapted on movement of the rod in one direction to engage the second unit and effect protraction thereof relative to the first unit against the action of the first means.

3. In a sway brace, a housing comprising a first unit adapted to be anchored to a support and a second unit slideable relative to the first unit, each unit including spaced first and second end walls, the first end wall of each unit being disposed between the end walls of the other unit, the first end wall of the first unit and the second end wall of the second unit having aligned through openings, first means including a spring and a movable member interposed between the first end walls of the units, said first means normally and yieldingly urging the second unit in a direction to effect retraction of the second unit relative to the first unit, and second means comprising a rod slideable through said openings and adapted to be moved in opposite directions, and a member carried by the rod and positioned between the second wall of the second unit and the first means, said member being adapted on movement of the rod in one direction to engage the second unit and effect protraction thereof relative to the first unit against the action of the first means, said member being adapted on movement of the rod in a reverse direction to coact with the first means to effect said retraction of the second unit relative to the first unit.

4. In a sway brace, a housing comprising a first unit adapted to be anchored to a support and a second unit slideable relative to the first unit, each unit including spaced first and second end walls, the first end wall of each unit being disposed between the end walls of the other unit, the first end wall of the first unit and the second end wall of the second unit having aligned through openings, first means including a spring and a movable member interposed between the first end walls of the units, said first means normally and yieldingly urging the second unit in a direction to effect retraction of the second unit relative to the first unit, and second means extending through said aligned openings and projecting into the housing, said second means including a rod that is slideable through the openings in opposite directions and a piston carried by the rod and registering with the opening in the first end wall of the first unit, said piston bearing at its opposite ends against the second end wall of the second unit and the first means, said piston being adapted on movement of the rod in one direction to effect protraction of the second unit relative to the first unit against the action of the first means.

5. In a sway brace, a housing comprising a first unit adapted to be anchored to a support and a second unit slideable relative to the first unit, each unit including spaced first and second end walls, the first end wall of each unit being disposed between the end walls of the other unit, the first end wall of the first unit and the second end wall of the second unit having aligned through openings, resilient first means interposed between the first end walls of the units and comprising a movable member adjacent the first end wall of the first unit and a spring intermediate the movable member and the first end wall of the second unit, said first means normally and yieldingly urging the second unit in a direction to effect retraction of the second unit relative to the first unit, and second means extending through said aligned openings and projecting into the housing, said second means including a rod that is slideable through the openings in opposite directions and a piston carried by the rod and registering with the opening in the first end wall of the first unit, said piston bearing at its opposite ends against the second end wall of the second unit and the movable member, said piston being adapted on movement of the rod in one direction to effect protraction of the second unit relative to the first unit against the action of the first means.

6. A sway brace in accordance wih claim 5 including adjustable means secured to the second unit and engaging the first means for varying the loading on the spring.

7. A sway brace in accordance with claim 5 wherein the spring comprises a helical compression spring that is substantially coaxial with the rod.

8. A sway brace in accordance with claim 5 wherein the spring comprises a helical compression spring that is substantially coaxial with the rod, the sway brace additionally including adjustable means carried by the first wall of the second unit and engaging the end of the spring remote from the movable member, said adjustable means being disposed within the housing and accessible from the exterior thereof.

9. A sway brace in accordance with claim 5 including a guide tube carried by the first end wall of the second unit and positioned within the housing, said rod projecting into the guide tube, and wherein the spring comprises a helical compression spring that is substantially coaxial with the rod and the guide tube and bears at its opposite ends against the movable member and the first end wall of the second unit.

References Cited in the file of this patent

UNITED STATES PATENTS

| | | |
|---|---|---|
| 221,181 | Moreland | Nov. 4, 1879 |
| 428,800 | Burnham et al. | May 27, 1890 |
| 912,927 | Winans | Feb. 16, 1909 |
| 2,372,214 | Loepsinger | Mar. 27, 1945 |